US009813325B2

(12) United States Patent
Syed et al.

(10) Patent No.: US 9,813,325 B2
(45) Date of Patent: Nov. 7, 2017

(54) INFORMATION STREAM MANAGEMENT

(71) Applicant: Comcast Cable Communications, LLC, Philadelphia, PA (US)

(72) Inventors: Yasser F. Syed, La Crescenta, CA (US); Paul David Egenhofer, Littleton, CO (US); Shawn Andrew Kercher, Parker, CO (US); Donald Dean Dischner, Elizabeth, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 382 days.

(21) Appl. No.: 13/728,400

(22) Filed: Dec. 27, 2012

(65) Prior Publication Data

US 2014/0185466 A1 Jul. 3, 2014

(51) Int. Cl.
*H04L 12/26* (2006.01)
*H04N 21/2343* (2011.01)
*H04N 21/845* (2011.01)
*H04N 21/262* (2011.01)

(52) U.S. Cl.
CPC ....... *H04L 43/50* (2013.01); *H04N 21/23439* (2013.01); *H04N 21/234327* (2013.01); *H04N 21/26258* (2013.01); *H04N 21/8451* (2013.01); *H04N 21/8456* (2013.01)

(58) Field of Classification Search
CPC ............... H04N 21/234; H04N 21/845; H04N 19/00872; H04N 19/009271; H04N 21/2662; H04N 21/4621; H04N 21/64792; H04N 21/234327; H04L 65/60; H04L 65/601; H04L 65/607
See application file for complete search history.

(56) References Cited

U.S. PATENT DOCUMENTS

| 6,831,949 | B1* | 12/2004 | Brightwell et al. | ..... 375/240.12 |
| 8,532,171 | B1* | 9/2013 | Narayanan et al. | ..... 375/240.01 |
| 2001/0036355 | A1* | 11/2001 | Kelly et al. | ..... 386/52 |

(Continued)

FOREIGN PATENT DOCUMENTS

| CA | 2837406 | 6/2014 |
| EP | 2750405 | 7/2014 |
| WO | WO-2011/102792 A1 | 8/2011 |

OTHER PUBLICATIONS

European Search Report dated Jun. 10, 2015 for EP 13198391.8, filed on Dec. 19, 2013 and published as EP 2750405 dated Jul. 2, 2014 (Applicant—Comcast Corp. // Inventor—Syed, et al.) (12 pages).

(Continued)

*Primary Examiner* — Scott M Sciacca
(74) *Attorney, Agent, or Firm* — Ballard Spahr LLP

(57) ABSTRACT

Aspects of the disclosure relate to management of information streams. The information streams can be delivered according to adaptive streaming mechanisms. In one aspect, a method of data stream management can comprise receiving a plurality of data streams having a specific bit rate and a segmentation signaling structure, comprising at least one segmentation signaling marker. The method may also comprise monitoring the segmentation signaling structure of at least one data stream and supplying, based on the monitoring, a metric indicative of compliance with a predetermined segmentation signaling structure.

29 Claims, 11 Drawing Sheets

(56) References Cited

U.S. PATENT DOCUMENTS

| | | | |
|---|---|---|---|
| 2002/0041628 A1* | 4/2002 | Andersson et al. | 375/240.12 |
| 2005/0123058 A1 | 6/2005 | Greenbaum et al. | |
| 2006/0153532 A1* | 7/2006 | McCrossan et al. | 386/95 |
| 2007/0201815 A1* | 8/2007 | Griffin | 386/52 |
| 2008/0126558 A1* | 5/2008 | Tinsman | H04L 47/10 709/232 |
| 2009/0147859 A1* | 6/2009 | McGowan | H04N 21/23424 375/240.26 |
| 2010/0014594 A1* | 1/2010 | Beheydt et al. | 375/240.26 |
| 2010/0118697 A1* | 5/2010 | Shumate | 370/230 |
| 2010/0189183 A1* | 7/2010 | Gu et al. | 375/240.28 |
| 2011/0119395 A1* | 5/2011 | Ha et al. | 709/231 |
| 2011/0235703 A1* | 9/2011 | Labrozzi et al. | 375/240.02 |
| 2011/0255535 A1* | 10/2011 | Tinsman | 370/390 |
| 2011/0268178 A1* | 11/2011 | Park et al. | 375/240.02 |
| 2011/0317771 A1* | 12/2011 | Chen et al. | 375/240.25 |
| 2012/0042091 A1* | 2/2012 | McCarthy et al. | 709/231 |
| 2012/0076015 A1* | 3/2012 | Pfeffer | 370/252 |
| 2012/0128061 A1* | 5/2012 | Labrozzi et al. | 375/240.02 |
| 2012/0185570 A1* | 7/2012 | Bouazizi et al. | 709/219 |
| 2012/0278449 A1* | 11/2012 | Wu et al. | 709/219 |
| 2012/0284419 A1* | 11/2012 | Brenes | 709/231 |
| 2013/0044803 A1* | 2/2013 | Fisher et al. | 375/240.02 |
| 2013/0064283 A1* | 3/2013 | Sun et al. | 375/240.01 |
| 2013/0091297 A1* | 4/2013 | Minder et al. | 709/231 |
| 2013/0293677 A1* | 11/2013 | Lee et al. | 348/43 |
| 2014/0050082 A1* | 2/2014 | Sun et al. | 370/230 |

OTHER PUBLICATIONS

Anonymous: "Text of I SO/I EC PDTR 23009-3 DASH Implementation Guidelines", 101. MPEG Meeting; Stockholm; No. N12891. Oct. 15, 2012 (40 pages).

Begen, Ali, et al., "Watching Video over the Web: Part 1: Streaming Protocols", IEEE Internet Computing. IEEE Service Center, New York, NY. Institute of Electrical and Electronics Engineers, vol. 15. No. 2. Mar. 1, 2011. pp. 54-63.

Wendell, Sun: "Multi Bit-rates Multicast Content Delivery with Adaptive Switching", 102. MPEG Meeting; Shanghai; No. m26669. Oct. 10, 2012 (6 pages).

* cited by examiner

INFORMATION STREAM MANAGEMENT

BACKGROUND

Data streaming, such as media streaming, is a technique for transferring data. With data streaming, a large set of data can be accessed sequentially without first obtaining the entire file. One application of streaming that has found wide acceptance is the streaming of audio and video files that are too large to be downloaded before they are consumed by an end user. Streaming technologies are becoming increasingly important with the growth of the Internet and other networks due to the amount of bandwidth needed to download large multimedia files quickly.

SUMMARY

It is to be understood that this summary is not an extensive overview of the disclosure. This summary is illustrative and not restrictive, and it is intended to neither identify key or critical elements of the disclosure nor delineate the scope thereof. The sole purpose of this summary is to explain and exemplify certain concepts of the disclosure as an introduction to the following complete and extensive detailed description. In one aspect, provided are methods and systems for data stream management that provide a means to indicate characteristics of a content fragment represented in a data stream at least partially independent of a signaling structure, thereby maximizing a quality of a deliverable content.

In an aspect, provided are methods and systems for providing an analysis of real time compliance of a data stream along with trending data that can improve operational robustness. Information that is extracted from such analysis can be provided for use on upstream aggregate operational displays such as system dashboards and monitor and control subsystems. In an aspect, the information can, for example, provide valuable stream longevity compliance along with unique stream performance trending based on, for example, user datagram protocol (UDP) port alignment, even when streams are being sourced from multiple different encoding platforms for delivery to particular destinations or to be part of the same channel grouping, Adaptive streaming can comprise switching between multiple bit rate data streams generated from the same content. For example, adaptive streaming can comprise switching between chunks of data originating from multiple bit rate data streams generated from the same content in a manner that causes no interruption in the display of the content. In order to switch between data streams there should be an alignment of the data streams at designated switching points (e.g., boundaries) to allow for movement between successive frames between one data stream and another data stream. Adaptive streaming can allow for creating of chunks in each of the data streams carrying the same content chunk. Otherwise, chunks can be created in the data streams that might slip from each other, and this slipping can cause an interruption in the display of the content. As an example, the signaling structure of the data streams can be the same at the switching points of each of the data streams. This configuration can allow for the same content chunk to be created across the set of data streams. As a further example, allowing the signaling structure of the data streams to be different outside of the switching points can facilitate the use of the data streams various devices and platforms independent of the signaling structure. Additionally, an aspect of the disclosure can allow for less complex decoding devices to use the lower set of data streams, for example using a baseline profile with no B frames in the lower set while using High Profile AVC in the upper set. Streams with sMPEG-2 and AVC streams can be mixed in this data set as well.

In an aspect, designated, time-sensitive switching points in a data stream can be used to characterize the data stream and correlate the data stream with other data streams. The designated switching points can be used to determine whether a particular data stream is either more or less related to other data streams. Accordingly, GOP structures in various data streams can vary between the data streams to improve quality and allow for changes in stream signaling structure for reuse of each stream independently, while maintaining compatibility between the data streams to be used in one or more adaptive streaming technologies.

The present disclosure also describes methods for data stream monitoring and management. In an aspect, one method can comprise receiving, at a computing device, a plurality of data streams, such as transport streams for a specific content. As an example, each transport stream (TS) of the plurality of transport streams can comprise a specific bit rate and/or quality level as well as a segmentation signaling structure comprising at least one segmentation signaling marker. The segmentation signaling structure of at least one transport stream of the plurality of transport streams can be monitored. Based on the monitoring, a metric indicative of compliance with a predetermined segmentation signaling structure can be provided.

Additional embodiments and advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain embodiments and principles of the methods and systems.

DETAILED DESCRIPTION

Figure 1A:
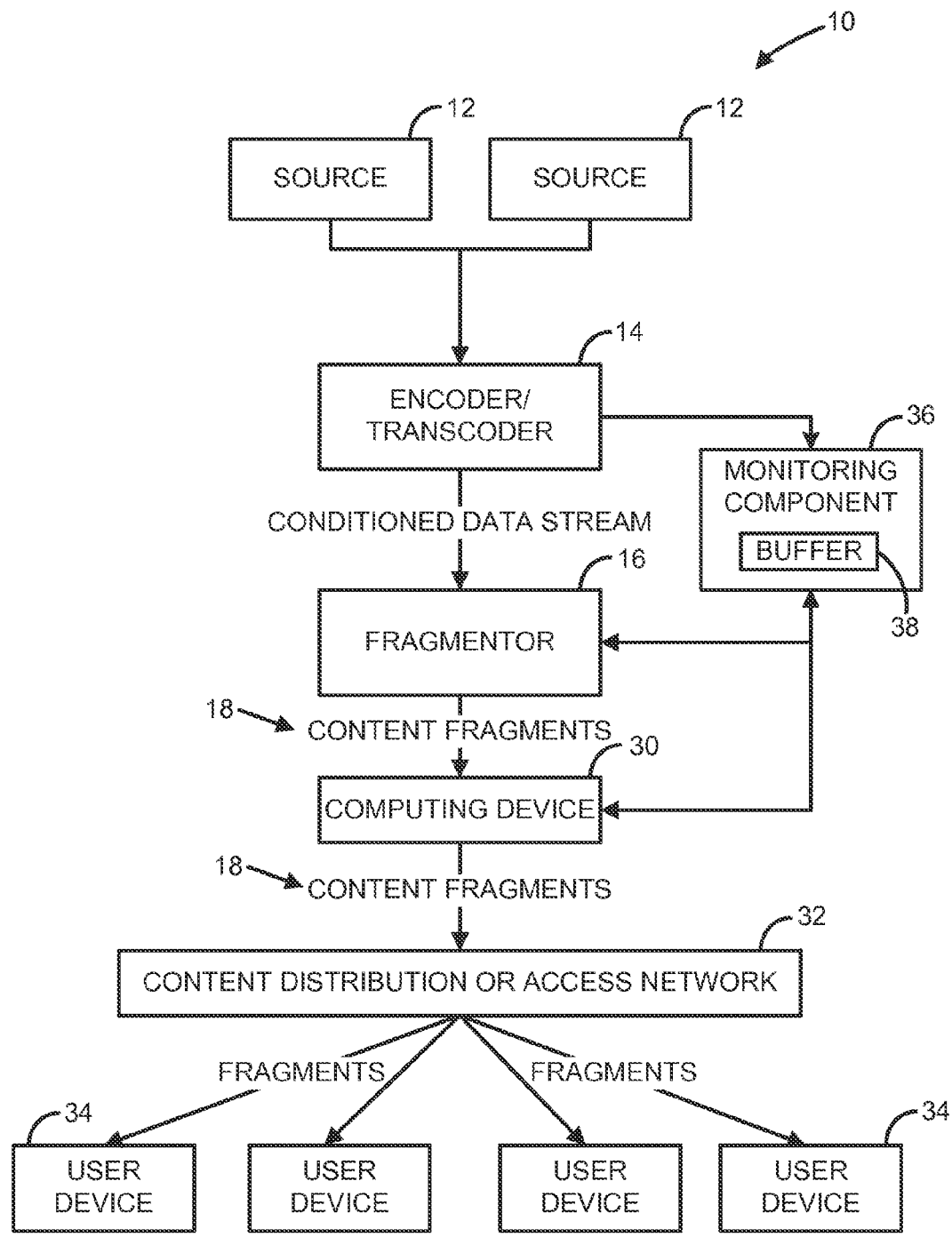
FIG. 1A is a block diagram of an exemplary data stream fragmentation network and process in accordance with one or more aspects of the disclosure.

Before the various example embodiments of the present disclosure are disclosed and described, it is to be understood that such embodiments, which include methods and systems, are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As utilized in this specification and the annexed drawings, the terms "system," "component," "unit," "interface," "platform," "node," "function," "device," and the like are intended to include a computer-related entity or an entity related to an operational apparatus with one or more specific functionalities, wherein the computer-related entity or the entity related to the operational apparatus can be either hardware, a combination of hardware and software, software, or software in execution. Such entities also are referred to as "functional elements." As an example, a unit can be, but is not limited to being, a process running on a processor, a processor, an object (metadata object, data object, signaling object), an executable computer program, a thread of execution, a program, a memory (e.g., a hard-disc drive), and/or a computer. As another example, a unit can be an apparatus with specific functionality provided by mechanical parts operated by electric or electronic circuitry which is operated by a software application or a firmware application executed by a processor, wherein the processor can be internal or external to the apparatus and can execute at least a portion of the software application or the firmware application. As yet another example, a unit can be an apparatus that provides specific functionality through electronic functional elements without mechanical parts, the electronic functional elements can include a processor therein to execute software or firmware that provides, at least in part, the functionality of the electronic functional elements. The foregoing examples and related illustrations are but a few examples and are not intended to be limiting. In addition, while such illustrations are presented for a unit, the foregoing examples also apply to a node, a function, a controller, a component, a system, a platform, and the like. It is noted that in certain embodiments, or in connection with certain aspects or features such embodiments, the terms "unit," "component," "system," "interface," "platform" "node," "function," "device," can be utilized interchangeably.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes. In addition, this disclosure uses certain terms relating to exemplarly video compression or encoding standards for convenience. For example, the terms "I-Frame" or "IDR-Frame" are often used to describe a first (or reference frame) in certain video compression technologies such as MPEG-2 or MPEG-4 (e.g., MPEG-4 Part 10-AVC/H.264). These terms are used herein for convenience, and are not intended to limit the scope of the disclosure to a particular video compression technology or format.

The systems and methods of the present disclosure can be used in adaptive or dynamic streaming and/or other processes of efficiently delivering streaming video to users by dynamically switching among different streams of varying quality and size during playback based upon the client player returning network condition information to the streaming server. For example, the systems and methods can deliver uninterrupted content even though the data used can be switched due to network bandwidth congestion issues. The systems and methods can provide users with an optimized viewing experience for the bandwidth and local computer hardware (CPU) available to the user by reducing quality, which viewers may feel is less important to the viewing experience, instead of allowing time interruptions in the viewing of the content to severely impact the viewer experience. As an example, the systems and methods can detect a user's bandwidth and CPU capacity in real time and adjust the quality (e.g., bit rate, resolution, etc.) of the video stream accordingly. In certain applications, adaptive streaming systems can comprise an encoder to process/condition a single source video at multiple bit rates (MBR). Accordingly, a player client receiving the MBR data stream can switch between streaming the different encodings (e.g., bit rates, quality levels) depending on available resources.

To manage and deliver large data files in a streaming environment, streaming technologies that involve an adaptive data stream can divide the data stream into smaller video fragments that are, for example, a few seconds long. The fragments can then be arranged sequentially to form a video in the streaming client. The fragments can comprise varying video quality and there can be multiple fragments corresponding to a single portion of a stream, each at different levels of quality. In an aspect, adaptive streaming systems, according to the present disclosure, can adapt to network and client changes by loading successive fragments in a higher or lower quality, as needed.

In order to keep track of all available quality levels and fragments, adaptive streams can comprise a manifest (e.g., small text or XML file) that can comprise basic information of all available quality levels and fragments. Accordingly, clients can load the manifest to gather information about the fragments. Then, the client can load the video fragments, generally in the best possible quality that is available at that point in time. Several conventional adaptive streaming technologies exist. For example, Microsoft provides a product known as IIS Smooth Streaming ("Smooth"), Adobe provides a product known as Flash Dynamic Streaming ("Flash" also called HDS), Apple provides HTTP Adaptive Bitrate Streaming ("Apple" also called HLS), and the Motion Picture Experts Group provides a product known as Dynamic Adaptive Streaming over HTTP ("MPEG-DASH"). Each of the conventional adaptive streaming technologies differ with respect to, among other things, compatible platforms, media containers, supported codecs (coders/decoders), end-to-end latency, and default fragment length. In an aspect, the present methods and systems can provide for adaptive streaming while maintaining independence from the platform compatibility format.

In an aspect, a fragment of a data stream can comprise a group of pictures (GOP) signaling structure. A GOP can be a group of successive pictures within a coded video stream. As an example, each coded video stream can comprise successive GOPs, from which the visible frames are generated.

In an aspect, a GOP can begin with an IDR-picture or IDR-frame (intra coded picture), which is a reference picture representing a fixed image and is independent of other picture types. As an example, certain video compression formats, such as MPEG-2, also refer to this reference image as an I-frame. The IDR-frame can represent the first image in a video sequence, and all of the subsequent frames in the GOP can be used to change the IDR-frame to create video. In an aspect, A P-picture or P-frame (predictive coded picture) can contain motion-compensated difference information from the preceding IDR- or P-frame. A B-picture or B-frame (bi-directionally predictive coded picture) can contain difference information from the preceding and following IDR- or P-frame within a GOP. As an example, a D-picture or D-frame (DC direct coded picture) can he a type of frame that serves the fast advance for MPEG-1 compression format.

As an example, when a stream fragment is restricted to a single GOP, the quality of the ultimate stream can suffer. This degradation in quality can occur because, among other reasons, the GOP structure has a single IDR frame but can have varied numbers of P, B, and D-frames, depending on the particular application. Where a fragment is set to a fixed length and contains a single GOP, as is the case in the current state of the art, the video quality within fragments can become inconsistent depending on the density of the data in the given fragment. For example, in order to maintain a quality level, two seconds of a high-speed action video can require more IDR-frames or P-frames than two seconds of dialog between two characters on an unchanging screen. Current adaptive streaming technologies' reliance on the GOP structure does not take these differences into account, however, and as a result, video quality can suffer. The systems and methods of the present disclosure can be at least partially independent of GOP structure. Accordingly, each fragment can comprise one or more IDR frames and the frames in the fragment can have various arrangements.

In an aspect, at a designated switching point of two or more data streams, the switching points can have identical frame types, such as an IDR or I frame, for example. As an example, fragment or segments can be created by chopping (or creating a segment copy) one or more of the data streams at the designated switching points. A data stream can comprise, for example, an elementary stream in an mpeg transport stream, In an aspect, identical data streams can have the same frame types throughout the entire signal structure of each of the two or more data streams. By characterizing the data streams as similar, rather than identical, only the switching point needs to have an identical frame type between the two or more data streams. Accordingly, the signaling structure of each of the data streams can partially differ, while maintaining compatibility between the streams for adaptive streaming. As an example, data streams can be less similar if the data streams do not align on all potential switching points in the stream time (e.g., linear time, file based observations, and the like). A comparison of the switching points of two or more data streams can facilitate the determination of signaling structure similarity between the two or more data streams. Management of data streams and data stream fragments can be based at least in part on the similarity of the data streams to be managed.

Disclosed are components that can be used to perform the described methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. The foregoing can apply to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems can take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. The present methods and systems can also take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Adaptive streaming is an advanced form of streaming that aims to adjust the quality of a data stream delivered to an end-user based on changing network conditions to ensure the best possible delivery experience (e.g., viewing video, listening to audio, and the like). Adaptive streaming also aims to provide an improved streaming media experience because a delivery of the data stream is adapted based upon the changing conditions of the user's network. The disclosure recognizes and addresses, in one aspect, the issue of insufficient or non-definitive process for verification of the rate segmentation signaling structure within a multi-bit rate adaptive data stream grouping. As described in greater detail below, the disclosure provides an adaptive streaming technology that is more flexible than conventional implementations and appears substantially smooth and seamless to users. In various aspects, the disclosure permits mitigation or avoidance of playback (or reproduction) disruption in response to up-scaling or down-scaling the quality of an information stream at midstream reproductions. In other aspects, the disclosure permits to monitoring and/or verifying that signaling markers are structured and spaced properly within an information stream.

In an aspect, a system for processing a data stream can comprise an encoder/transcoder to condition fragments of the data stream and/or encode information relating to each of the fragments for downstream processing of the fragments.

FIG. 1A illustrates various aspects of an exemplary network and system in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

FIG. 1A is a block diagram of an exemplary data stream fragmentation network and system 10. In an aspect, the network and system 10 can comprise one or more data sources 12 in signal communication with an encoder 14. As an example, a fragmentor 16 can be in signal communication with the encoder 14. For example, one or more fragmentors 16 can receive communication from an encoder 14. The network and/or system 10 can comprise other components such as processors, routers, network devices and the like.

In an aspect, the one or more data sources 12 can comprise a data feed, signal source, file source, content provider, and the like. In an aspect, the one or more data sources 12 can be a content provider of data such as audio content, video content, news feed, sports programming, and the like. As an example, the one or more data sources 12 can be configured to transmit the data stream to various end-users (e.g., or allow access to the data stream). As another example, the one or more data sources 12 can be a network data feed transmitting the data stream to subscribers or clients. As a further example, the one or more data sources 12 can transmit or allow access to the data stream in a standard video format, such as, but not limited to, any of the Moving Picture Experts Group standards (e.g., MPEG-2, MPEG-4, a single MPEG-4 video encapsulated in an MPEG-2 transport stream over UDP MCAST, etc.), or any of the standards for audio and/or video, such as MP3, Quicklime, and Audio Video Interleave (avi). However, the encoder 14 can receive the data stream from any source having any format that can be encoded (or transcoded) into a format that is appropriate for streaming.

The encoder 14 can be any device, system, apparatus, or the like to encode and/or transcode the data stream. In an aspect, the encoder 14 converts input video having a single bit rate (by way of example, a high bit rate quality video), to an output video of one or more data streams of other bit rates (by way of example, a lower bit rate quality video). In another example, the encoder 14 can convert the data stream from the input format received from the data source (such as MPEG-4) to a transport format for distribution to users or consumers (such as MPEG-2). In an aspect, the encoder 14 can comprise a device such as a transcoder that conditions streaming data and/or changes data from one format to another. In an aspect, the encoder 14 can comprise a separate encoder and transcoder for conditioning streaming data and/or changing the data from one format to another. As an example, the encoder 14 can receive or access the data stream from the input 12 and can encode/transcode information onto the data stream. As a further example, the encoder 14 can add information to the stream relating to content fragments 18.

Figure 1B:
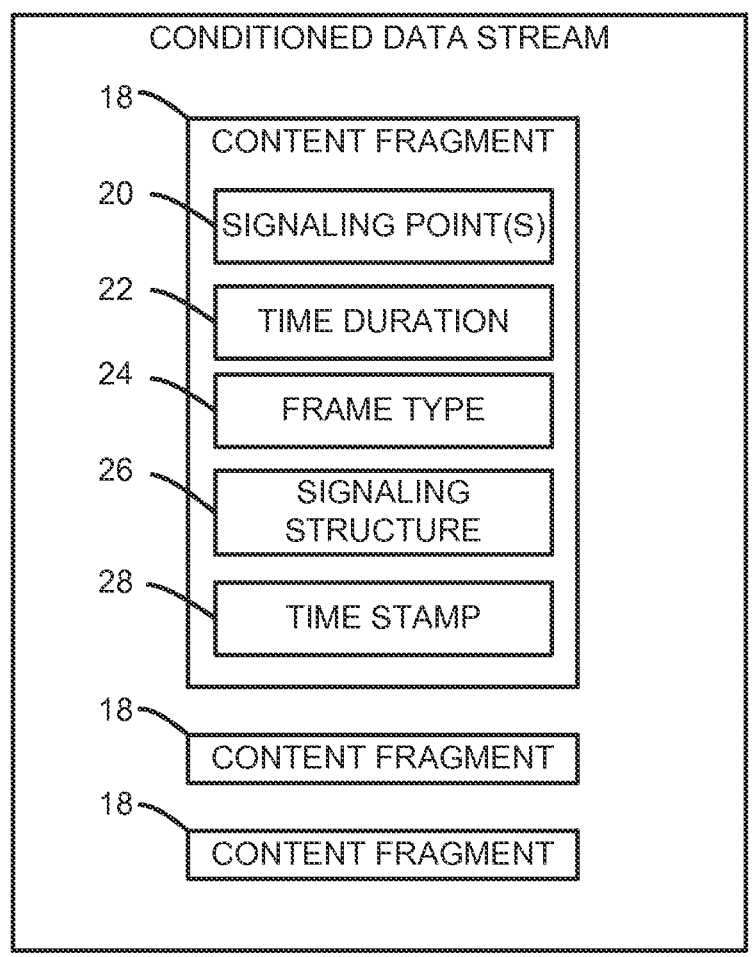
FIG. 1B is a block diagram of an exemplary data stream in accordance with one or more aspects of the disclosure.

Turning now to FIG. 1B, content fragments will be discussed in greater detail. As shown in FIG. 1B, the exemplary data stream comprises content that can be divided into one or more content fragments 18. In an aspect, a data stream can comprise a plurality of content fragments. As an example, each of the fragments can comprise a plurality of frames of content. As a further example, the content fragments can be grouped together to form a larger content stream. As an example, each of the content fragments 18 can comprise a particular bit rate and resolution. As a further example, the data stream can be an adaptive data stream and each of the content fragments 18 can comprise variable characteristics such as bit rate and resolution.

As shown in FIG. 1B, the content fragments 18 can be defined by one or more signaling points 20 (e.g., boundaries, switching points, etc.) and a pre-defined time duration 22. In an aspect, the content fragment 18 can comprise one or more frames having a frame type 24 (e.g., I, IDP, P, B, etc.). As an example, the one or more of the signaling points 20 can be an indicated point in a video format appropriate for streaming that can be assignable to a video frame independent of a signaling structure 26, such as GOP structure, of the data stream. By allowing fragments that are independent of the GOP structure, a fragment of video can be created flexibly such that the fragment comprises an appropriate number of GOPs (or portions thereof) for a given scene. By way of example, a fragment containing high-speed action can comprise a large number of frames I or IDR, but need not be limited to a single GOP, thus allowing an appropriate amount of video information to be encoded into the fragment so as to smoothly display the scene without removing information that was present in the original data stream received from the data source 12. Furthermore, each of the content fragments 18 formed from the data stream can have different characteristics such as duration, resolution, and bit rate.

In an aspect, the encoder 14 can be configured to encode the data stream with information indicative of at least one of the signaling points 20 and the signaling structure 24 of at least one of the content fragments 18 in the data stream. As an example, the data stream can comprise a GOP structure including a plurality of pre-defined frames. As an example, any of the frames can be configured by the encoder 14 to define at least one of the signaling points 20 of each of the content fragments 18.

In an aspect, the encoder 14 can be configured for encoding the data stream with a Coordinated Universal Time (CUT) or Universal Time Coordinated (UTC) stamp 28 indicative of a time the encoder 14 conditions the data stream. As an example, the time stamp 28 can be indicative of a time the boundary flag is encoded in the data stream. In an aspect, CUT/UTC is a time standard based upon the international atomic clock and can be relied upon by various computer networks, the Internet, and in aviation to coordinate time between systems across the world. Other standard time system and universal time systems can be used.

In an aspect, the encoder 14 can encode the above-described information in a data field (e.g., private field, header, metadata, and the like) associated with the data stream. By way of example, information bits can be placed in a private data field (e.g., AU_Information, PVR assist field, and the like) of an adaptation field of the MPEG transport stream. (See SCTE128, international standard ISO/IEC 13818-1, and DVB 101-154, each of which is hereby incorporated herein by reference in its entirety). The use of a field such as the adaptation field can be beneficial to system performance because the information bits can be part of a video packet and precede the video data, where it is not necessary to look further into the video data to discover the encoded information. As an example, the random_access_indicator field in a conventional MPEG-2 adaptation_field typically indicates that the current data packet contains some information to aid random access. Accordingly, the access indicator field can be used by the encoder 14 to indicate that information relating to at least the identification and marking of content fragments 18 can be included in the data stream. However, the information can be encoded in any data structure associated with the content such that a device receiving the content will also receive the information and will be able to use the information to analyze, parse, and/or fragment the content. By way of example, the MPEG-4 standard can comprise a supplemental enhancement information (SEI) level that would provide space for encoding the information bits into the stream. In particular, an SEI message can be created and placed at every location within the stream. However, as technology and standards develop, the information can be inserted by the encoder 14 into other fields, headers, and the like, or can be placed in separate files associated with the content. In an aspect, the data stream can be encoded with a plurality of bits that are subsequently accessible by downstream devices such as the fragmentor 16 when parsing the data stream.

Figure 2A:
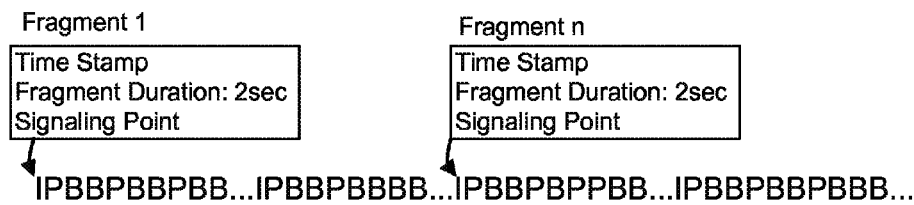
FIGS. 2A-2C are block diagrams representing frames of exemplary conditioned data streams in accordance with one or more aspects of the disclosure.
Figure 2B:
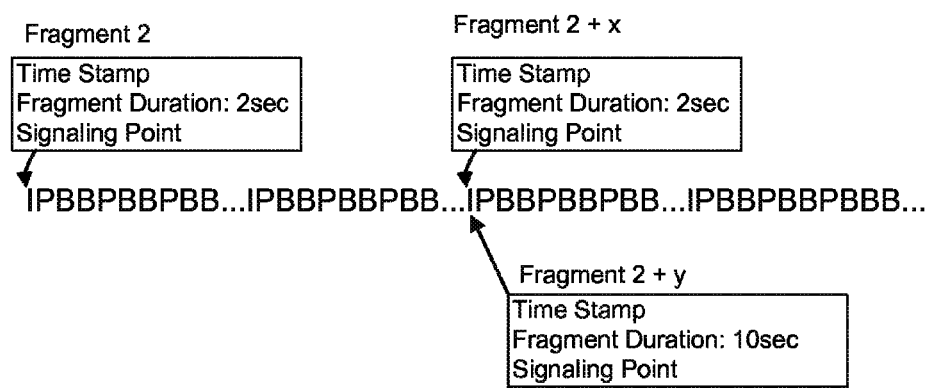
Figure 2C:
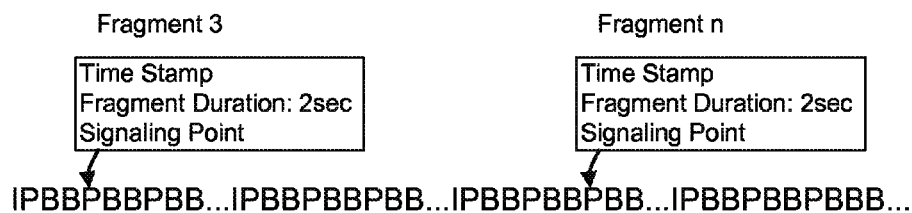

As an example, FIG. 2A illustrates a plurality of frames representing an exemplary conditioned data stream. Referring to FIGS. 2A, 2B, and 2C, for illustrative purposes only, the data stream can be represented by a series of letters (I, P, and B), each of which signifies a frame in an exemplary data stream. As shown in FIGS. 2A, 2B, and 2C, the I can represent an IDR-frame, the P can represent a P-frame, and the B can represent a B-frame. The sequence of frames shown is intended only to be a representative example of a data stream, and is in no way limiting on the type or sequence of frames that the system 10 can process. In addition, FIGS. 2A, 2B, and 2C each have one or more boxes representing fragment boundaries and associated information. As seen in the figures, each fragment identifies a frame with which it is associated for the purposes of the example shown.

As described in FIG. 2A, a first data entry can be inserted in a first IDR frame representing a Fragment 1. The first data entry can comprise an identification of time stamp 28, the fragment's duration 22 (two seconds), and an identification of the signaling point 20 of Fragment 1. A second data entry can be inserted in a second IDR frame representing a Fragment n. The second data entry can comprise an identification of time stamp 28, the fragment's duration 22 (two seconds), and an identification of the signaling point 20 of Fragment n. Similarly, other frames can be encoded with entries to indicate at least one of a time stamp 28, the fragment's duration 22, an identification of the signaling point 20, a frame type 24, and an identification of a signaling structure 26. Any number of content fragments 18 can be labeled and identified in the data stream. Accordingly, a downstream device such as the fragmentor 16 can receive the conditioned data stream and construct the appropriate content fragments 18 for distribution to an end user. The downstream device is not limited to a single GOP structure for the construction of each of the content fragments 18 from the conditioned data stream. In an aspect, a downstream device can manage the flow of two or more data streams based upon a similarity of signaling points 20 of the two or more data streams.

FIG. 2B illustrates a plurality of frames representing another exemplary conditioned data stream. By way of example only, the data stream shown in FIG. 2B has been conditioned such that it can be processed for two types of streaming technologies: one that requires two-second fragments, and a second that requires ten-second fragments. As shown in FIG. 2B, for illustrative purposes only, a first data entry can be inserted in a first IDR frame representing a Fragment 2. The first data entry can comprise an identification of time stamp 28, the fragment's duration 22 (two seconds), and an identification of the signaling point 20 of Fragment 2. A second data entry can be inserted in a second IDR frame representing a Fragment 2+x (representing a number of two second fragments). The second data entry can comprise an identification of time stamp 28, the fragment's duration 22 (two seconds), and an identification of the signaling point 20 of Fragment 2+x. A third data entry can be inserted in the second IDR frame representing a Fragment 2+y (representing a number often second fragments). The third data entry can comprise an identification of time stamp 28, the fragment's duration 22 (ten seconds), and an identification of the signaling point 20 of Fragment 2+y. Accordingly, various downstream devices having different requirements for stream processing can receive the conditioned data stream and construct the appropriate content fragments 18 for distribution to an end user such that the fragments will be compatible with the underlying streaming technology.

As a further example, FIG. 2C illustrates a plurality of frames representing another exemplary conditioned data stream, wherein a fragment boundary is encoded independent of a GOP structure of the data stream. As shown in FIG, 2C, as an illustrative example only, a first data entry can be inserted in a first non-IDR frame representing a Fragment 3. The first data entry can comprise an identification of time stamp 28, the fragment's duration 22 (two seconds), and an identification of the signaling point 20 of Fragment 3. A second data entry can be inserted in a second non-IDR frame representing a Fragment n. The second data entry can comprise an identification of time stamp 28, the fragment's duration 22 (two seconds), and an identification of the signaling point 20 of Fragment n. Similarly, other frames (both IDR-frames and non-IDR frames) can be encoded with entries to indicate at least one of a signaling structure information 26, the signaling point 20, the fragment's duration 22, and frame type 24 of one or more frames of a particular content fragment 18. Any number of content fragments 18 can be labeled and identified in the data stream. Since the downstream device is not limited to a single GOP structure for the construction of each of the content fragments 18, the insertion of data entries and boundaries into non-IDR frames can be subsequently processed by the downstream device to construct the appropriate content fragments 18 for distribution to an end user.

Figure 3:
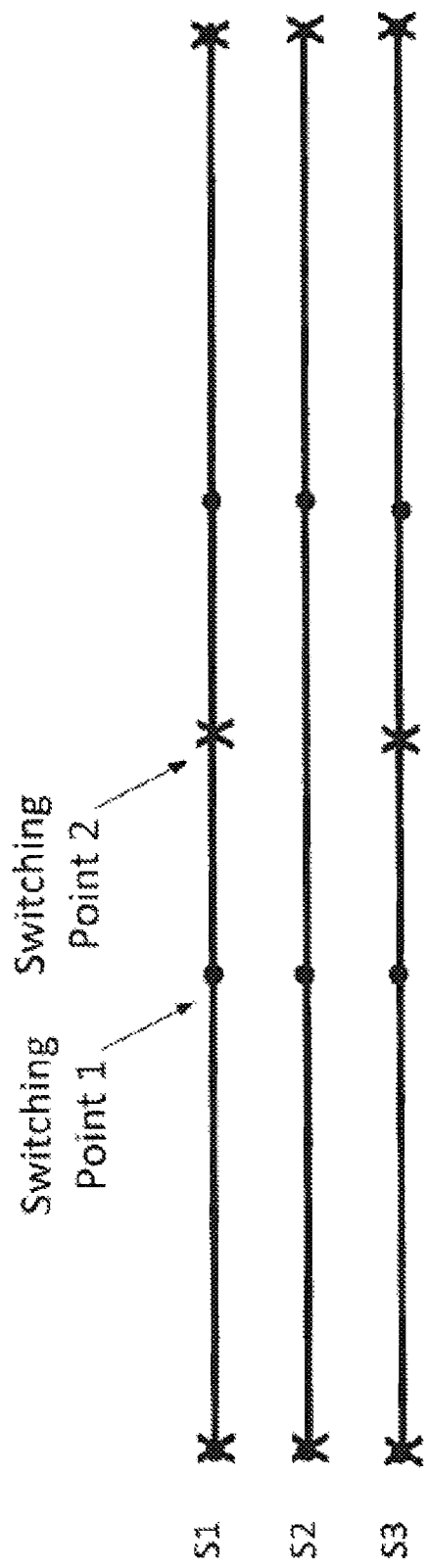
FIG. 3 is a graphical representation of data stream analysis in accordance with one or more aspects of the disclosure.

Turning now to FIG. 3, one or more switching points of one or more data streams can be compared to determine a metric relating to the one or more data streams. In an aspect, the metric can be a compliance metric indicative of a compliance of the data stream relative to one or more rules. As an example, the metric can be a similarity metric indicative of a similarity between two or more data streams. As illustrated in FIG. 3, a first data stream S1 is similar to a second data stream S2. However, data stream S1 is more similar to data stream S3. As an example, data streams can be less similar if the data streams do not align on all potential switching points in the stream time (e.g., linear time, file based observations, and the like).

Figure 4:
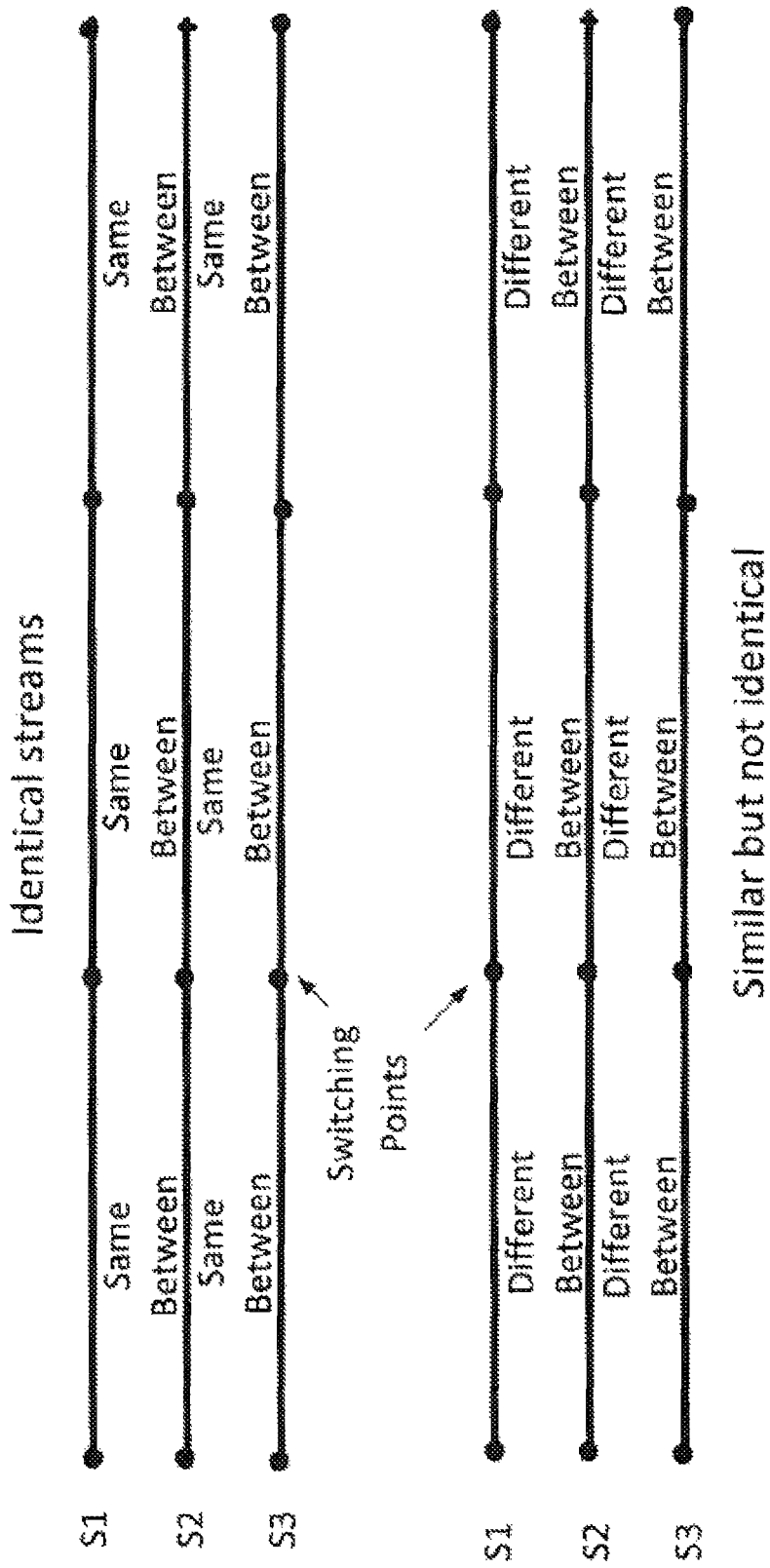
FIG. 4 is a graphical representation of data stream analysis in accordance with one or more aspects of the disclosure.

Turning now to FIG. 4, one or more switching points of one or more data streams can be compared to determine a metric relating to the one or more data streams. In an aspect, the metric can be a similarity metric indicative of a similarity of two or more data streams based upon a comparison of two or more signaling points, such as switching points. In an aspect, identical data streams have the same frame types throughout the entire signal structure of each of the two or more data streams. By characterizing the data streams as similar, rather than identical, only the switching point needs to have an identical frame type between the two or more data streams. Accordingly, the signaling structure of each of the data streams can partially differ, while maintaining compatibility between the streams for adaptive streaming. A comparison of the switching points of two or more data streams can facilitate the determination of signaling structure similarity between the two or more data streams. Management of data streams and data stream fragments can be based at least in part on the similarity of the data streams to be managed.

In an aspect, a system for processing a data stream can comprise a fragmentor to separate a data stream into fragments of the data for downstream processing of the content. In connection with FIG. 1A, the fragmentor 16 can be in signal communication with the encoder 14 to receive the data stream therefrom. In an aspect, the fragmentor 16 conditions the data stream for downstream distribution by a computing device 30 such as server through a content distribution or access network 32 to user devices 34 or consumer devices. In an aspect, the computing device 30 can be an origin server (e.g., Hypertext Transfer Protocol (HTTP)). However, other computing devices and servers can be used. As an example, the fragmentor 16 can communicate with the computing device 30 using the POST method of the Hypertext Transfer Protocol (HTTP). However, other protocols and communication methods can be used. In an aspect, provider-supplied and/or user-supplied devices can be disposed downstream of the content distribution or access network 32 and upstream one or more user device 34. As an example the provider-supplied and/or user-supplied devices can be configured to process the fragments such as de-fragmenting. Other devices and configurations can be used.

In an aspect, the fragmentor 16 can separate or fragment the data stream into each of the content fragments 18 represented by the data stream based upon an information encoded onto the data stream by the encoder 14. As an example, the fragmentor 16 can access the information encoded/inserted in the data stream by the encoder 14 to define the content fragments 18 based on, among other things, boundaries, switching, timing, and duration from the encoded data stream. Once the content fragments 18 are generated, the content fragments 18 can be transmitted to the content distribution or access network (CDN) 32 for delivery to the user devices 34 or client for playback. As an example, the computing device 30, CDN 32, and the user device 34 can intercommunicate using the GET method of the HTTP. However, other protocols and communication methods can be used.

Figure 5:
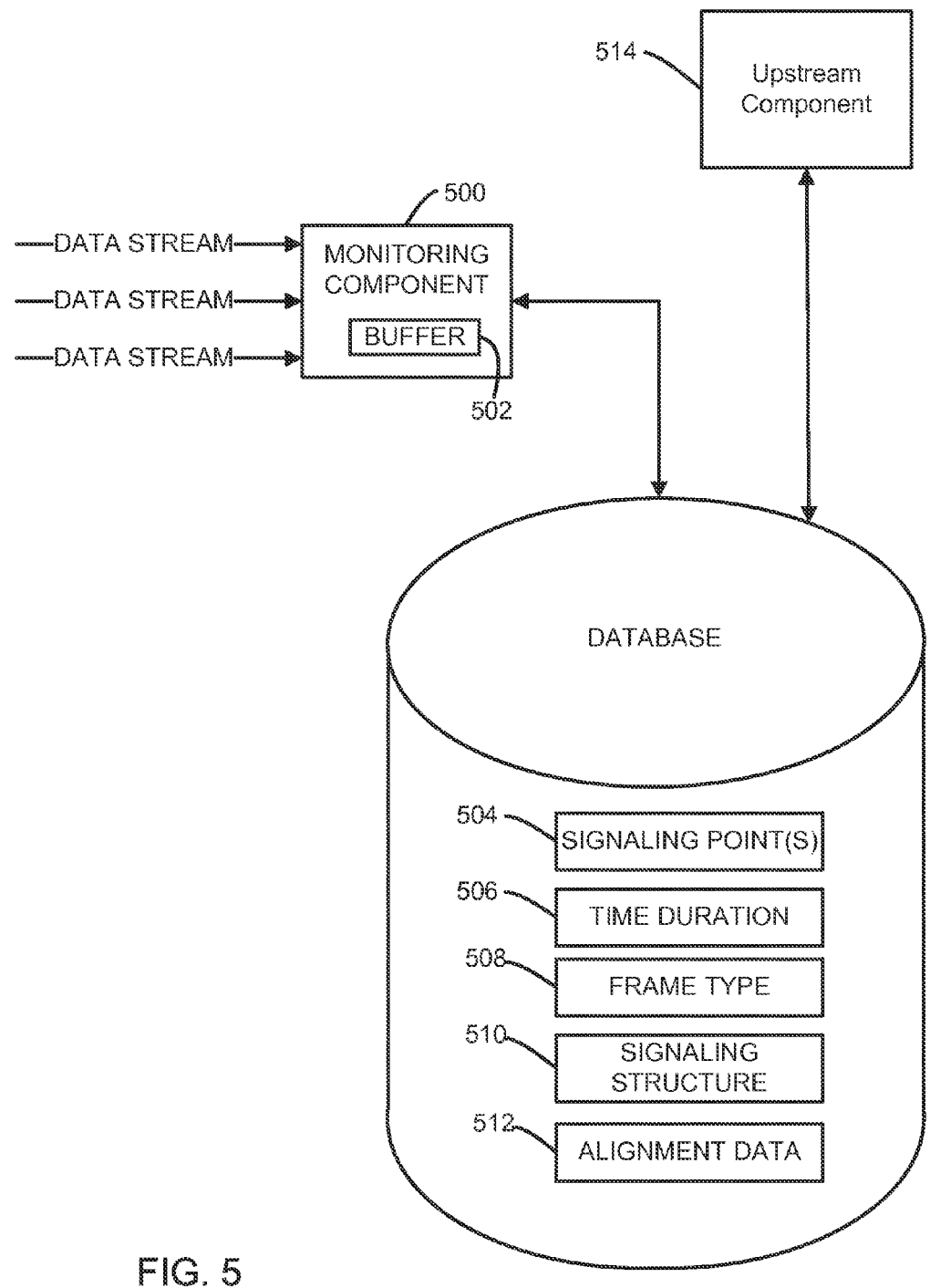
FIG. 5 is a block diagram of an exemplary data stream monitoring system in accordance with one or more aspects of the disclosure.

FIG. 5 illustrates an example system for processing a data stream in accordance with one or more aspects of the disclosure. As an example, the system can comprise a monitoring component for receiving and/or analyzing one or more data streams. As an example, the monitoring component 500 can monitor and/or analyze one or more data stream such as multi-bit rate adaptive transport stream multicasts within a channel grouping. As a further example, the monitoring component 500 can analyze each of the data streams simultaneously. In an aspect, the monitoring component 500 can parse through the MPEG header information in real time to identify and verify that the signaling structure of the one or more data streams is properly formatted within the applicable MPEG packets. In an aspect, the monitoring component 500 can comprise a storage medium such as a buffer 502 for buffering one or more data streams for analysis.

In an aspect, the monitoring component 500 can compare the one or more data streams to one or more pre-defined rules. As an example, the rules can be stored in a database 503. As a further example, the rules can relate to one or more of signaling points 504, time duration 506, frame type 508, signaling structure 510, and alignment 512 of one or more data streams. Other rules and comparators can be used. In an aspect, the monitoring component 500 can be configured to generate one or more metrics based upon the monitoring and/or analysis of the one or more data streams. Information that is extracted from such analysis can be provided for use on one or more upstream components 514, such as aggregate operational displays, system dashboards, and/or monitor and control subsystems. The information can provide valuable stream longevity compliance along with unique stream performance trending based on user datagram protocol (UDP) port alignment, even when streams are being sourced from multiple different encoding platforms for the same channel grouping. The monitor and/or analysis process of the monitoring component 500 can facilitate downstream devices to perform the segmenting the data streams based on one or more of the analyzed signaling points, the framing structure accuracy, and duration of each segment to ensure that one or more frames are aligned across each of the multi-bit rate streams within a channel grouping.

Figure 6:
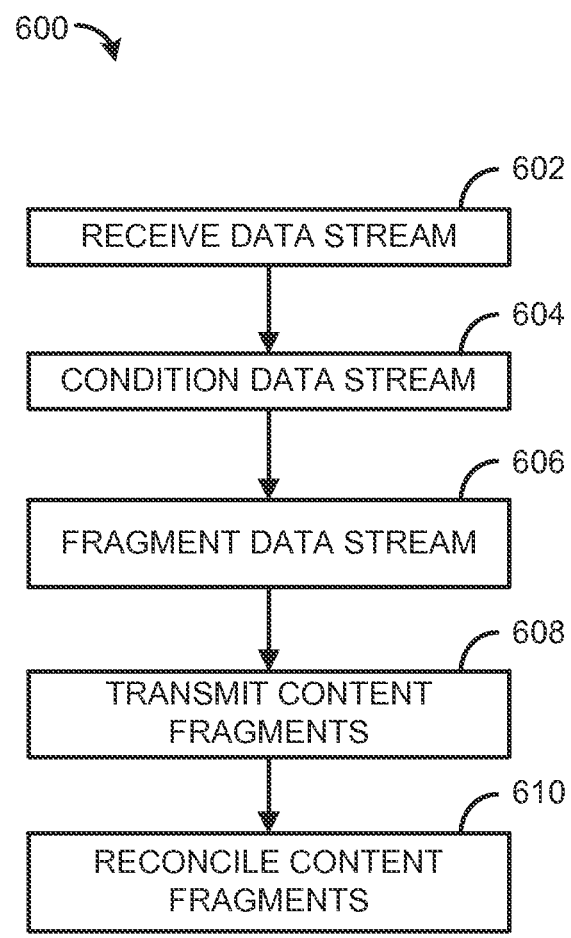
FIG. 6 is a flow chart of an exemplary method for conditioning a data stream in accordance with one or more aspects of the disclosure.

In an aspect, provided are methods for processing a data stream comprising encoding information relating to each of a plurality of content fragments of the data stream for downstream processing of the content stream. FIG. 6 illustrates an example method 600 of data stream fragmentation in accordance with one or more aspects of the disclosure. It should be appreciated that FIG. 6 is discussed herein, for illustrative purposes only, with reference to FIG, 1 and FIG, 2 in order to provide operational context. In step 602, the encoder 14 can receive the data stream from one or more data sources 12 and can process/condition the data stream. In step 604, the encoder 14 can encode/transcode information onto the data stream relating to the content fragments 18 represented by the data stream. In particular, a switching point (e.g., signaling point 20) can be inserted into the data stream to represent a switching position of one of the content fragments 18. In an aspect, the encoder 14 can receive encoding/transcoding information relating to a programming parameter. For example, a signal can be transmitted to the encoder 14 identifying a particular streaming technology such as Microsoft IIS Smooth Streaming, Adobe Flash Dynamic Streaming, and Apple HTTP Adaptive Bitrate Streaming. Accordingly, the encoder 14 can define a signaling structure 26 to match the appropriate program. As a further example, the data stream transmitted to the encoder 14 can comprise information relating to programming parameters that can be received by the encoder 14. In an aspect, a universal time can be determined. In an aspect, a coordinated universal time (UTC) can be determined by the encoder 14 or a clock-enabled device in communication with the encoder 14. As an example, the universal time can be transmitted to the encoder 14 from a remote source. As a further example, the universal time can be inserted into the data stream to represent a time the data stream was encoded. Other time stamps can be used such as network time protocol (NTP), presentation time stamp (PTS), decode time stamp (DTS), normal playback time (NPT), Society of Motion Picture and Television Engineers (SMPTE) Time code, and the like.

In step 606, the encoded data stream can be received by the fragmentor 16 to fragment the data stream in accordance with the encoded information and to define the content fragments 18 represented thereby. Once the content fragments 18 are generated, the content fragments 18 can be distributed to a client (e.g., end-user or consumer) in step 608. For example, the content fragments 18 can be stored in the computing device 30 where they can then be accessed by the user device 34 (e.g., via a user interface).

In step 610, the user device 34 can receive the content fragments 18 and adaptively select the most appropriate sequence of the content fragments 18 to reconcile the content fragments as a substantially seamless media playback.

Figure 7:
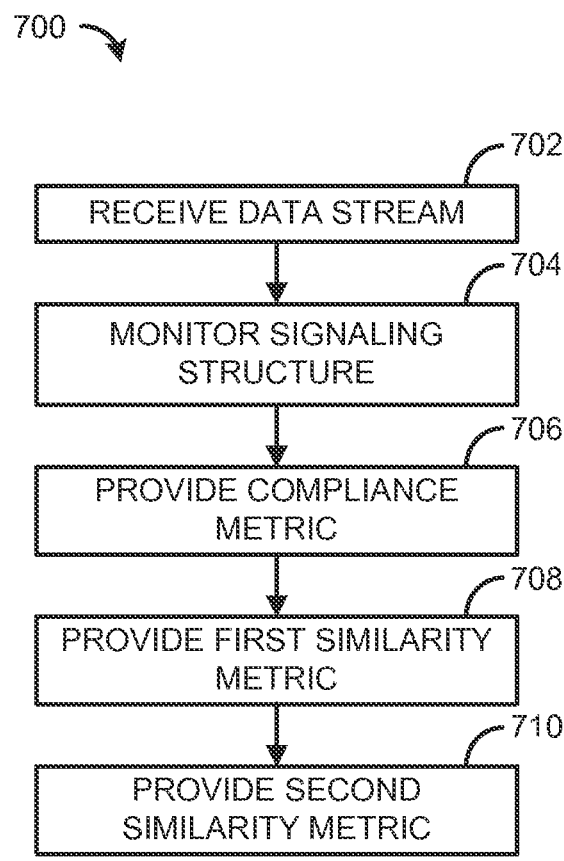
FIG. 7 is a flow chart of an exemplarly method for analyzing a data stream in accordance with one or more aspects of the disclosure.

FIG. 7 illustrates an exemplary method 700 of data stream management. FIG. 7 will be discussed, for illustrative purposes only, with reference to FIG. 1 and FIG. 2. In step 702 one or more data streams can be received. In an aspect, the one or more data streams can be a multi-bit rate adaptive transport stream multicast for a specific content and/or channel grouping. As an example, each of the one or more data streams can comprise one or more of a specific bit rate and a segmentation signaling structure. As a further example, the segmentation signaling structure can comprise at least one segmentation signaling marker such as a switching point.

In step 704, the segmentation signaling structure of at least one of the one or more data streams can be monitored. In an aspect, one or more of the monitored data streams can be a multi-bit rate adaptive transport, stream associated with a media asset. As an example, the media asset can be a linear-programming asset or a recorder media asset. In an aspect, the segmentation signaling structure of two or more transport, streams of the plurality of transport streams can be monitored. As an example, the segmentation signaling structure of each packet of each transport stream of the plurality of transport streams can be monitored. As a further example, monitoring the segmentation signaling structure of each packet can comprise assessing in real-time header information of each packet.

Figure 8:
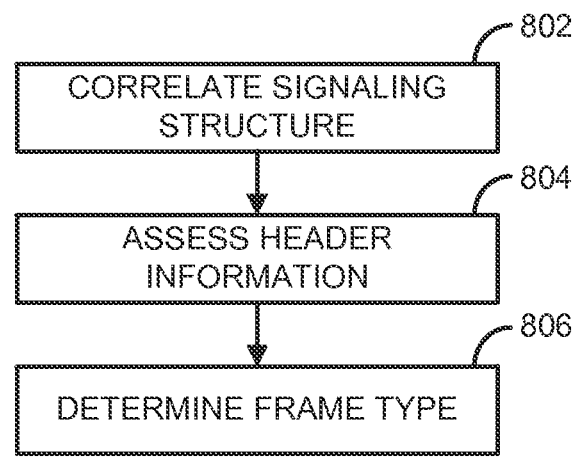
FIG. 8 is a flow chart of an exemplary method for analyzing a data stream in accordance with one or more aspects of the disclosure.

FIG. 8 illustrates a method for monitoring signaling structure of one or more data streams. In an aspect, the method illustrated in FIG. 8 can be executed as a subroutine of step 704 of FIG. 7. However, other step sequences can be used. In step 802, signaling structure of one or more data streams can be correlated. As an example, two or more data streams can be compared to determine a similarity therebetween.

In step 804, header information in at least, one data stream can be assessed. In an aspect, header information for at least one packet of at least one transport stream can be assessed. As an example, the header information can be assessed in substantially real-time. As a further example, the assessing the header information in substantially real-time can comprise determining the presence or absence of a time stamp for each header. In an aspect, in response to presence of the time stamp, assessing the header information in substantially real-time can comprise assessing formatting of the time stamp.

In step 806, a frame type can be determined. In an aspect, a frame type can be identified for a packet having a time stamp. As an example, the frame type can comprise one of an intra-frame or an inter-frame. As a further example, the frame type can comprise one of an instantaneous decoder refresh (IDR) frame or an I-frame. However, other frames can be identified.

Returning to FIG. 7, in step 706, a metric indicative of compliance (i.e., compliance metric) can be provided for at least one of the one or more data streams. In an aspect, the compliance metric can be based upon the monitoring conducted in step 704. As an example, the compliance metric can represent the compliance of at least one of the one or more data streams with a predetermined segmentation signaling structure. As a further example, monitoring the segmentation signaling structure of the two or more transport streams can comprise correlating at least the segmentation signaling structure between the two or more transport streams based at least on the monitoring. Correlating can comprise parsing one or more data streams to a designated switching point, extracting each streams time stamp at the switching point, verifying a frame type at the switching point, and comparing time stamp value across the multiple data streams. The correlating process can be executed in real time by buffering all of the streams of a program and analyzing. The con-elating process can be performed in parallel upon multiple data streams at the same time.

In step 708, a first similarity metric can be provided for at least one of the one or more data streams. In an aspect, the first similarity metric can be based upon the monitoring conducted in step 704. As an example, the first similarity metric can be indicative of alignment of a segmentation signaling structure of a first data stream and a segmentation signaling structure of a second data stream. The first data stream and the second stream can be included in two or more transport streams. In an aspect, the first similarity metric can comprise a metric indicative of a number of packets in two or more transport streams having a common time stamp.

In step 710, a second similarly metric can be provided for at least one of the one or more data streams. In an aspect, the second similarity metric can be based upon the monitoring conducted in step 704. As an example, the second similarity metric can be indicative of alignment of the segmentation signaling structure of the first data stream and the segmentation signaling structure of the second data stream. As a further example, the second similarity metric can be indicative of a number of frames in the first data stream having a frame type different from respective frames in the second data stream.

Figure 9:
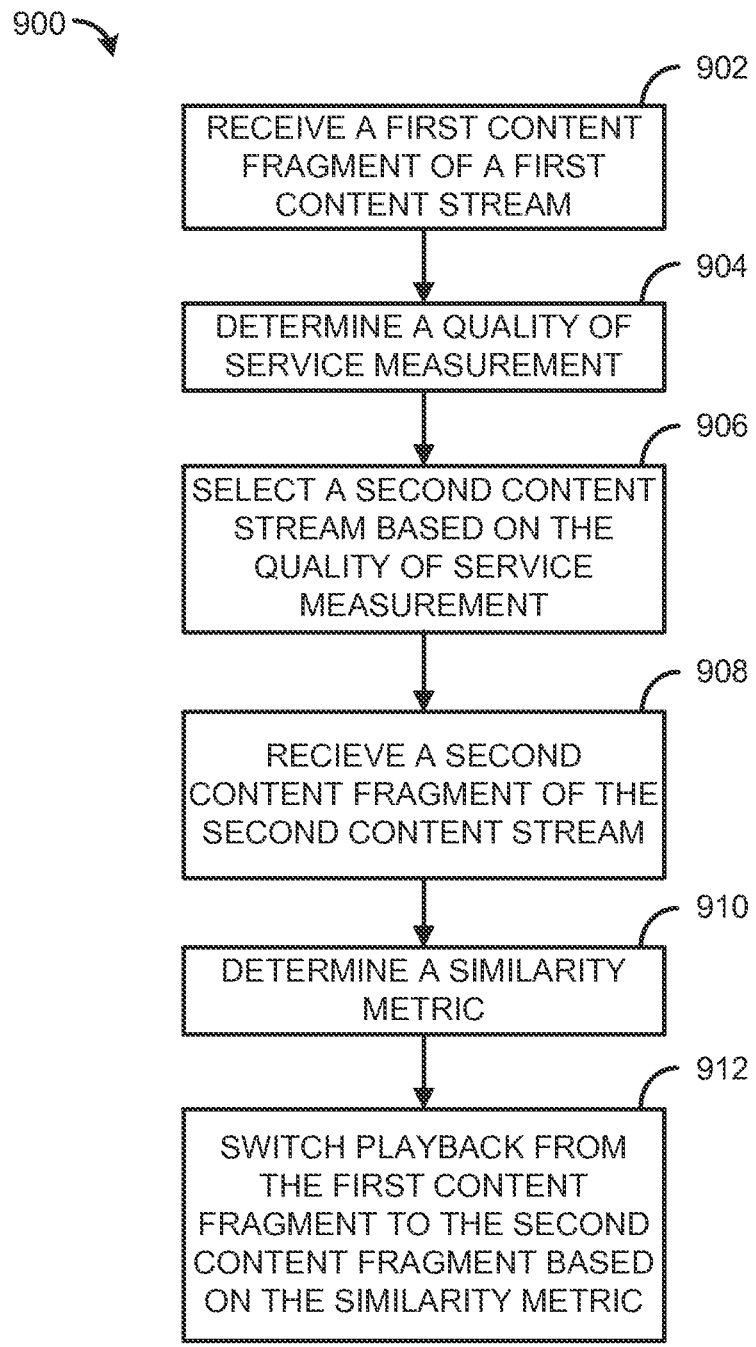
FIG. 9 is a flowchart illustrating an exemplary method for content management.

FIG. 9 is a flowchart illustrating an exemplary method 900 for content management. In one aspect, the method 900 can illustrate aspects of the disclosure as performed at a user device 34 shown in FIG. 1A. The method 900, however, is not necessarily limited to implementation on the user device 34. In step 902, a first content fragment of a first content stream can be received. For example, the first content stream can be part of a content stream intended for adaptive streaming. In one aspect, the first content stream can comprise a content source encoded at a first bit rate, but a plurality of content streams at different bit rates can be associated with the content source. Additionally, the first content fragment can comprise a first segmentation signaling marker. In step 904, a quality of service measurement can be determined. In one aspect, the qualify of service measurement can comprise a measurement of bandwidth, processor capacity, memory availability, user preference, and the like.

In step 906, a second content stream can be selected based on the quality of service measurement. In an aspect, the second content stream can comprise the content source encoded at a second bit rate. For example, the second content stream can be identified from a list of content streams. The list of content streams can comprise a plurality of available streams encoded at different bit rates, different resolutions (e.g., 1080p, 720p, 480p), frame rates (e.g., 30 fps, 24 fps), and/or the like. In one aspect, the list of content streams is received in a manifest file from the content provider. After accessing the list of content streams, the user can request the second content stream from a content server. In one aspect, the user device can request a second content fragment located in the second content stream. In another aspect, the second content stream can be determined from a plurality of content streams based on the similarity metric described below, In step 908, the second content fragment of the second content stream can be received. The second content fragment can comprise a second segmentation signaling marker. For example, the first segmentation signaling marker can identify a frame in the first content segment and the second segmentation signaling marker can indicate a frame in the second content segment. For example, the second segmentation signaling marker and the first segmentation signaling marker can each can indicate and/or comprise a respective frame in a group of pictures structure. In one aspect, the frame indicated by first segmentation signaling marker can be the first or last frame in the first content segment. Similarly, the frame indicated by the second segmentation signaling marker can be the first or last frame in the second content segment. The frames indicated by the first segmentation signaling marker and second segmentation signaling marker can switching points for the purpose of segmenting and de-segmenting encoded content before and after transmission from a content provider to a user device.

In step 910, a similarity metric can be determined. In one aspect, the similarity metric can be determined by receiving the similarity metric from a server. In another aspect, the similarity metric can be measured and/or calculated by the user device. For example, the similarity metric can indicate similarity between the first content fragment and the second content fragment. In one aspect of step 910, a similarity between the first segmentation signaling marker and the second segmentation signaling marker can be determined. In another aspect of step 910, an alignment of a first segmentation signaling structure of the first content stream and a second segmentation signaling structure of the second content stream can be determined. Additionally, in step 910, a number can be determined of frames in the first content stream having a frame type different from respective frames in the second content stream. In a further aspect of step 910, a frame type (e.g., IDR-frame, B-frame, P-frame) at the first segmentation signaling marker can be compared to a frame type (e.g., IDR-frame, B-frame, P-frame) at the second segmentation signaling marker. For example, a frame type of a first frame of the first content segment can be compared to a first frame of the second content segment. In step 912, playback can be switched from the first content fragment to the second content fragment based on the similarity metric. For example, the user device can play the first content segment followed by the second content segment. Alternatively, the second content segment can be played instead of the first content segment. In one aspect, the playback can be switched such that content is provided for a user of the user device substantially seamlessly.

Figure 10:
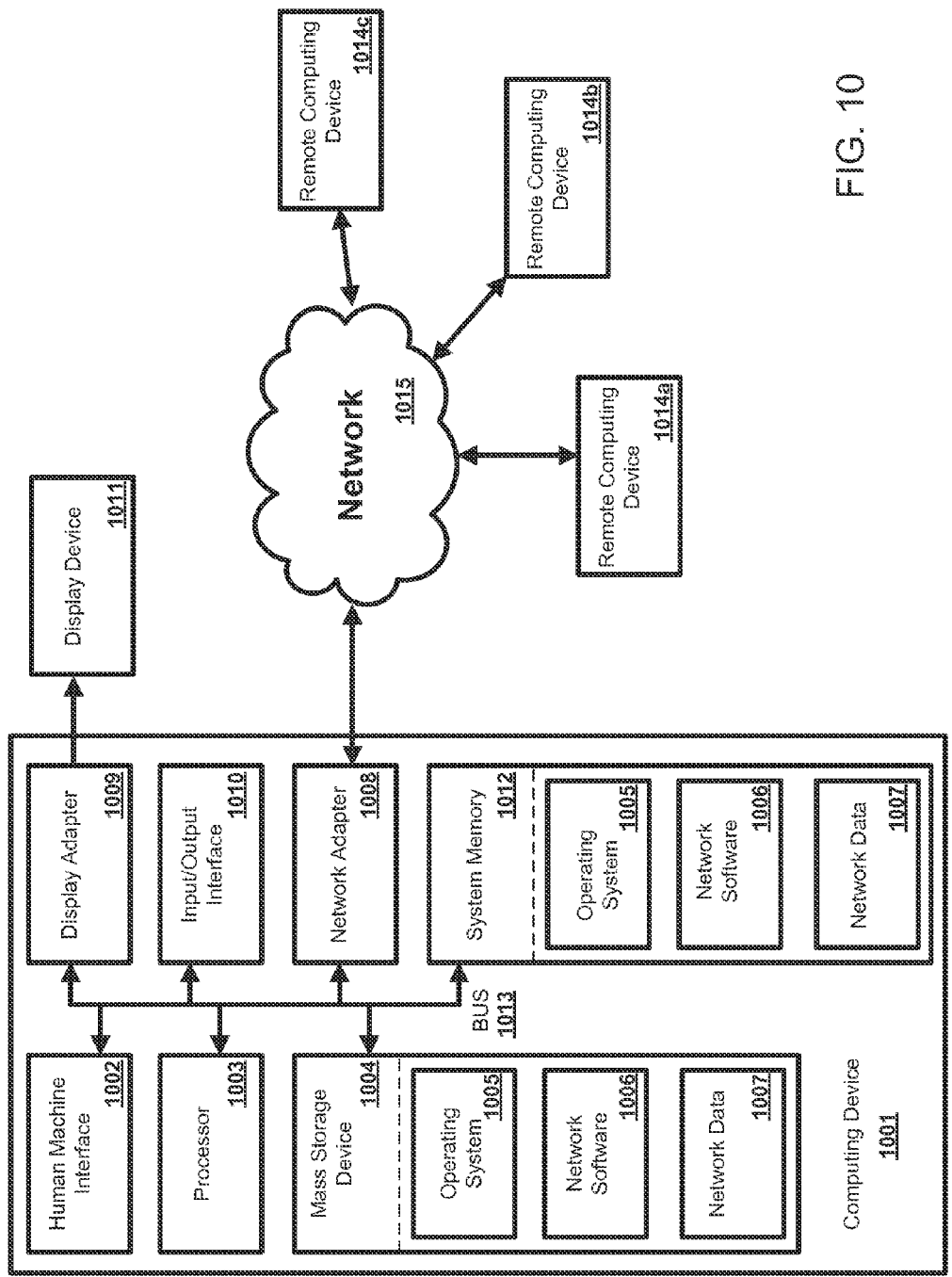
FIG. 10 is a block diagram of an exemplary computing device and network in accordance with one or more aspects of the disclosure.

In an exemplary aspect, the methods and systems can be implemented on a computing system such as computing device 1001 as illustrated in FIG. 10 and described below. By way of example, one or more of the server 30, monitoring component 36, 500, and user devices 34 of FIGS. 1 and 5 can be a computing device, as illustrated in FIG. 10. Similarly, the methods and systems disclosed can utilize one or more computers to perform one or more functions in one or more locations. FIG. 10 is a block diagram illustrating an exemplarly operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, tablets, cell phones, smart phones, downstream devices, network PCs, minicomputers, mainframe computers, distributed computing environments that comprise any of the above systems or devices, and the like.

The processing of the disclosed methods and systems can be performed in response to execution of software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 1001. The components of the computing device 1001 can comprise, but are not limited to, one or more processors or processing units 1003, a system memory 1012, and a system bus 1013 that couples various system components including the processor 1003 to the system memory 1012. In the case of multiple processing units 1003, the system can utilize parallel computing.

The system bus 1013 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 1013, and all buses specified in this description can also be implemented over a wired or wireless network connection and each of the subsystems, including the processor 1003, a mass storage device 1004, an operating system 1005, network software 1006, network data 1007, a network adapter 1008, system memory 1012, an Input/Output Interface 1010, a display adapter 1009, a display device 1011, and a human machine interface 1002, can be contained within one or more remote computing devices 1014*a,b,c* at physically separate locations, connected through buses of this form, in effect implementing a fully distributed system.

The computing device 1001 typically comprises a variety of computer readable media. Exemplary readable media can be any available media that is accessible by the computing device 1001 and comprises, for example and not meant to be limiting, both volatile and non-volatile media, removable and non-removable media. The system memory 1012 comprises computer readable media in the form of volatile memory, such as random access memory (RAM), and/or non-volatile memory, such as read only memory (ROM). The system memory 1012 typically contains data such as network data 1007 and/or program modules such as operating system 1005 and network software 1006 that are immediately accessible to and/or are presently operated on by the processing unit 1003.

In another aspect, the computing device 1001 can also comprise other removable/non-removable, volatile/non-volatile computer storage media. By way of example, FIG. 10 illustrates a mass storage device 1004 which can provide non-volatile storage of computer code, computer readable instructions, data structures, program modules, and other data for the computing device 1001. For example and not meant to be limiting, a mass storage device 1004 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1004, including byway of example, an operating system 1005 and network software 1006. Each of the operating system 1005 and network software 1006 (or some combination thereof) can comprise elements of the programming and the network software 1006. Network data 1007 can also be stored on the mass storage device 904. Network data 1007 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 1001 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 1003 via a human machine interface 1002 that is coupled to the system bus 1013, but can be connected by other interface and bus structures, such as a parallel port, game port, an IEEE 1394 Port (also known as a Firewire port), a serial port, or a universal serial bus (USB).

In yet another aspect, a display device 1011 can also be connected to the system bus 1013 via an interface, such as a display adapter 1009. It is contemplated that the computing device 1001 can have more than one display adapter 1009 and the computer 1001 can have more than one display device 1011. For example, a display device can be a monitor, an LCD (Liquid Crystal Display), or a projector. In addition to the display device 1011, other output peripheral devices can comprise components such as speakers (not shown) and a printer (not shown) which can be connected to the computing device 1001 via Input/Output Interface 1010. Any step and/or result of the methods can be output in any form to an output device. Such output can be any form of visual representation, including, but not limited to, textual, graphical, animation, audio, tactile, and the like. The display 1011 and computing device 1001 can be part of one device, or separate devices.

The computing device 1001 can operate in a networked environment using logical connections to one or more remote computing devices 1014*a,b,c*. By way of example, a remote computing device can be a personal computer, portable computer, a smart phone, a server, a router, a network computer, a peer device or other common network node, and so on. Logical connections between the computing device 1001 and a remote computing device 1014*a,b,c* can be made via a network 1015, such as a local area network (LAN) and a general wide area network (WAN). Such network connections can be through a network adapter 1008. A network adapter 1008 can be implemented in both wired and wireless environments. Such networking environments are conventional and commonplace in dwellings, offices, enterprise-wide computer networks, intranets, and the Internet.

For purposes of illustration, application programs and other executable program components such as the operating system 1005 are illustrated herein as discrete blocks, although it is recognized that such programs and components reside at various times in different storage components of the computing device 1001, and are executed by the data processors) of the computer. An implementation of network software 1006 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rales generated through a neural network or production rules from statistical learning).

The system for data stream fragmentation with scalability provides several advantages over conventional encoding/fragmenting systems in addition to allowing the use of multiple distributed fragmentors. For example, the system offers the ability to accelerate the parsing of a stream by using multiple fragmentors. It also allows for a common stream with common signaling information that can be used by multiple different streaming technologies. The system also allows the synchronization of playback of a stream among two or more clients, in that the clients can communicate with one another to cause each to play identically-named fragments at the same time.

It will he apparent to those skilled in the art that various modifications and variations can be made without departing from the scope or spirit of the present disclosure. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
receiving, from at least one encoder, a plurality of data streams for specific content, each data stream of the plurality of data streams having a specific bit rate and a segmentation signaling structure comprising at least one segmentation signaling marker;
monitoring, by a monitoring device, the segmentation signaling structure of at least one data stream of the plurality of data streams;
determining, by the monitoring device and based on the monitoring, a compliance metric indicative of compliance with one or more rules related to the segmentation signaling structure;
supplying, to a system management device used by a service provider for analyzing compliance of the at least one encoder to the one or more rules, the compliance metric; and
supplying a metric indicative of a number of packets in two or more data streams of the plurality of data streams having a common time stamp.

2. The method of claim 1, wherein the monitoring the segmentation signaling structure of the at least one data stream of the plurality of data streams further comprises monitoring the segmentation signaling structures of the two or more data streams of the plurality of data streams.

3. The method of claim 2, further comprising supplying a first similarity metric indicative of alignment of a first segmentation signaling structure of a first data stream and a second segmentation signaling structure of a second data stream based at least on the monitoring the segmentation signaling structures of the two or more data streams, the first data stream and the second data stream being included in the two or more data streams.

4. The method of claim 3, further comprising supplying a second similarity metric indicative of alignment of the first segmentation signaling structure of the first data stream and the second segmentation signaling structure of the second data stream, and wherein the second similarity metric is based on a number of frames in the first data stream having a frame type different from a frame type of corresponding frames in the second data stream.

5. The method of claim 2, wherein the monitoring the segmentation signaling structure of the two or more data streams comprises correlating at least the segmentation signaling structures of the two or more data streams.

6. The method of claim 1, wherein the monitoring the segmentation signaling structure of the at least one data stream comprises assessing, in real-time, header information in at least one packet of the at least one data stream.

7. The method of claim 6, wherein the assessing, in real-time, the header information in the at least one packet of the at least one data stream comprises determining a presence or an absence of a time stamp for each header in the at least one packet.

8. The method of claim 7, further comprising identifying a frame type for a packet having the time stamp, wherein the frame type comprises one of an intra-frame or an inter-frame.

9. The method of claim 8, wherein the intra-frame further comprises one of an intermediate data rate instantaneous decoder refresh (IDR) frame or an I-frame.

10. The method of claim 1, further comprising monitoring the segmentation signaling structure of each packet of each data stream of the plurality of data streams.

11. The method of claim 7, wherein in response to determining the presence of the time stamp, the assessing, in real-time, the header information in the at least one packet of the at least one data stream further comprises assessing formatting of the time stamp.

12. The method of claim 10, wherein the monitoring the segmentation signaling structure of each packet comprises assessing, in real-time, header information of each packet.

13. The method of claim 1, wherein each data stream of the plurality of data streams is a multi-bit rate adaptive data stream associated with a media asset, the media asset being a linear-programming asset or a recorder media asset.

14. The method of claim 1, wherein the at least one encoder comprises a first encoder and a second encoder, and wherein a first data stream of the plurality of data streams is received from the first encoder and a second data stream of the plurality of data streams is received from the second encoder.

15. An apparatus, comprising:
one or more processors; and
a memory storing processor executable instructions that, when executed by the one or more processors, cause the apparatus to:
receive, from at least one encoder, a plurality of data streams for a specific content, each data stream of the plurality of data streams having a specific bit rate and a segmentation signaling structure comprising at least one segmentation signaling marker;
monitor the segmentation signaling structure of at least one data stream of the plurality of data streams;
determine, based on the monitoring, a compliance metric indicative of compliance with one or more rules related to the segmentation signaling structure;

supply the compliance metric to a system management device used by a service provider for analyzing compliance of the at least one encoder to the one or more rules; and supply a metric indicative of a number of packets in two or more data streams of the plurality of data streams having a common time stamp.

16. The apparatus of claim 15, wherein the processor executable instructions, when executed by the one or more processors, further cause the apparatus to monitor the segmentation signaling structures of the two or more data streams of the plurality of data streams.

17. The apparatus of claim 16, wherein the processor executable instructions that, when executed by the one or more processors, cause the apparatus to monitor the segmentation signaling structure of the two or more data streams further comprise processor executable instructions that, when executed by the one or more processors, cause the apparatus to correlate at least the segmentation signaling structures of the two or more data streams.

18. The apparatus of claim 16, wherein the processor executable instructions that, when executed by the one or more processors, cause the apparatus to monitor the segmentation signaling structure of the at least one data stream further comprise processor executable instructions that, when executed by the one or more processors, cause the apparatus to assess, in real-time, header information in at least one packet of the at least one data stream.

19. The apparatus of claim 15, wherein the processor executable instructions, when executed by the one or more processors, further cause the apparatus to supply a first similarity metric indicative of alignment of a first segmentation signaling structure of a first data stream and a second segmentation signaling structure of a second data stream based at least on monitoring the segmentation signaling structures of the two or more data streams, the first data stream and the second data stream being included in the two or more data streams.

20. The apparatus of claim 19, wherein the processor executable instructions, when executed by the one or more processors, further cause the apparatus to supply a second similarity metric indicative of alignment of the first segmentation signaling structure of the first data stream and the second segmentation signaling structure of the second data stream, and wherein the second similarity metric is based on a number of frames in the first data stream having a frame type different from a frame type of corresponding frames in the second data stream.

21. The apparatus of claim 15, wherein the at least one encoder comprises a first encoder and a second encoder, and wherein a first data stream of the plurality of data streams is received from the first encoder and a second data stream of the plurality of data streams is received from the second encoder.

22. A method, comprising:
receiving a first data stream and a second data stream, the first data stream having a first segmentation signaling structure for content at a first bit rate, the second data stream having a second segmentation signaling structure for the content at a second bit rate;

determining at least one similarity metric indicative of similarity between the first segmentation signaling structure and the second segmentation signaling structure, wherein the similarity metric is indicative of a number of packets in the first data stream having time stamps matching time stamps of packets in the second data stream; and supplying the similarity metric to a component configured to manage the content.

23. The method of claim 22, wherein the first segmentation signaling structure comprises a first segmentation signaling marker and the second segmentation signaling structure comprises a second segmentation signaling marker.

24. The method of claim 23, wherein the determining the similarity metric comprises comparing a frame type at the first segmentation signaling marker to a frame type at the second segmentation signaling marker.

25. The method of claim 22, wherein the determining the at least one similarity metric comprises determining an alignment of the first segmentation signaling structure and the second segmentation signaling structure.

26. The method of claim 22, wherein the determining the at least one similarity metric comprises determining a number of frames in the first data stream having a frame type different from a frame type of corresponding frames in the second data stream.

27. The method of claim 22, wherein the determining the at least one similarity metric comprises assessing, in real-time, header information in at least one packet of the first data stream and at least one packet of the second data stream.

28. The method of claim 27, wherein the assessing, in real-time, the header information in the first data stream and the second data stream comprises determining a presence or an absence of a time stamp for each header in the at least one packet of the first data stream and the at least one packet of the second data stream.

29. The method of claim 22, wherein the component is configured to adjust segmenting of the first data stream, the second data stream, or a combination thereof based on the at least one similarity metric.

* * * * *